United States Patent [19]

Itai et al.

[11] E Re. 28,849

[45] Reissued June 8, 1976

[54] SURFACE PREPARATION PROCESS FOR RECOATING OF USED COATED METALLIC ELECTRODES

[75] Inventors: Reiichi Itai; Hideo Kanai, both of Maebashi, Japan

[73] Assignee: The Japan Carlit Co., Ltd., Tokyo, Japan

[22] Filed: Oct. 9, 1975

[21] Appl. No.: 621,021

Related U.S. Patent Documents

Reissue of:

[64] Patent No.: 3,841,983
Issued: Oct. 15, 1974
Appl. No.: 348,115
Filed: Apr. 5, 1973

[30] Foreign Application Priority Data

Aug. 28, 1972 Japan ..... 47-85281

[52] U.S. Cl. ..... 204/146; 204/129.75
[51] Int. Cl.[2] ..... C25F 5/00; C25F 3/00
[58] Field of Search ..... 204/146, 140, 130, 129.75

[56] References Cited

UNITED STATES PATENTS

| | | | |
|---|---|---|---|
| 2,185,858 | 1/1940 | Mason | 204/146 |
| 2,371,529 | 3/1945 | Loose | 204/146 |
| 3,560,358 | 2/1971 | Black | 204/129.75 |

*Primary Examiner*—T. M. Tufariello
*Attorney, Agent, or Firm*—Flynn & Frishauf

[57] ABSTRACT

A surface preparation process for use in recoating of used metallic electrodes coated with one or more platinum group metals, one or more iron group metals, or chemical compounds thereof, which comprises using said metallic electrode(s) as anode(s) and passing a current between said metallic electrode(s) and a steel cathode(s) in an aqueous solution of sulfuric acid, nitric acid, perchloric acid, salts thereof, chlorates or persulfates, or a mixture solution thereof, and then dipping said metallic electrode(s) into an aqueous solution of hydrofluoric acid or hydrochloric acid.

12 Claims, 1 Drawing Figure

SURFACE PREPARATION PROCESS FOR RECOATING OF USED COATED METALLIC ELECTRODES

Matter enclosed in heavy brackets [ ] appears in the original patent but forms no part of this reissue specification; matter printed in italics indicates the additions made by reissue.

BACKGROUND OF THE INVENTION

Field of the Invention

This invention relates to a surface preparation process for use in recoating of used metallic electrodes comprising a conductive substrate coated with one or more platinum group metals, an iron group metal, or chemical compounds thereof. More particularly, the invention relates to a surface preparation process for recoating of used metallic electrodes(s), which comprises using said metallic electrode(s) as anode(s) and passing a current between said electrode(s) and steel cathode(s) in an aqueous solution of sulfuric acid, nitric acid, perchloric acid, salts thereof, chlorates or persulfates, or a mixture solution thereof, and then dipping said metallic electrodes in an aqueous solution of hydrofluoric acid or hydrochloric acid.

Description of the Prior Art

The use of coated metallic electrodes as anodes in an electrolytic bath consisting of an aqueous solution of alkali metal chlorides has recently been proposed. Said coated metallic electrodes consist of a combination of corrosion resistant metals, such as titanium, zirconium, tantalum or niobium as a conductive substrate metal and the coating thereon comprises one or more of platinum group metals, iron group metals, or chemical compounds thereof, for example oxides. Said coated anodes show excellent chlorine overvoltage [ characteristic ] *characteristics*, have dimensional stability and can be produced at relatively low cost. However, these coated anodes cause a gradual increase in bath voltage, because in use the metals coated on the substrate are gradually depleted and this leads to poor performance of the anodes and to oxidation of the substrate metals and this, in turn, causes a rapid increase of the bath voltage. Finally, the substrate metals are badly damaged, resulting in extremely disadvantageous operation. Accordingly, in view of the high cost of the anodes, particularly that of the substrate metals, as soon as an increase of the bath voltage is detected, it is necessary to remove the coated anodes from the bath and recoat them.

Before a new coating can be applied, it is necessary to completely remove whatever coating remains and the oxides of the substrate metals to obtain a substrate surface to which the new coating will adhere. If the surface of the substrate metal is not clean or is cleaned incompletely, the new coating will not be uniform and strong. Then, when such anodes are used the coating is rapidly depleted and leads to such disadvantages as an increase in the bath voltage or shorter anode life. In order to obtain good recoating, complete cleaning of the substrate metal surface is imperative.

Several methods of removing the coating remaining on a used anode have already been proposed. As examples of the prior art, U.S. Pats. 3,573,100 and 3,684,577 disclose a method of cleaning an anode by treating with a melt containing a material that is chemically a base. Also, Japanese Patent Public Diclosure No. [ 631,972 ] *63/1972* discloses a method of cleaning an anode by treating with a mixture of hydrofluoric acid with at least one of other mineral acids such as hydrochloric or sulfuric acid, in solution. Treating with a melt has an advantage in that it results in minimum damage to the metallic substrate. However, in practicing [ the ] *this* method there are disadvantages because high [ temperture-resistant ] *temperature-resistant* materials are required for the apparatus, the operation is hazardous, and the cost is high in batch operations. The acid solution method has disadvantages in that more than 10 percent by weight of the metallic substrate is lost and, also, the parts of the surface of the metallic substrate from which the coating has separated, are attacked by the acid and become rough, thereby making the surface of the metallic substrate unsuitable for recoating.

SUMMARY OF THE INVENTION

It is an object of the present invention to provide a simple and economical process for removing the conductive coating from used coated metallic electrodes.

Another object of the present invention is to provide a method which removes the conductive coating from used coated metallic electrodes rapidly and with a minimum of damage to the metallic substrate.

A further object of the present invention is to provide a method for removing the conductive coating from used coated metallic electrodes as well as the oxides of the substrate metal from its surface, thereby providing a metallic substrate surface to which a new conductive coating will adhere firmly.

These and further objects and advantages of the present invention will become apparent to those skilled in the art from the specification and claims which follow.

It was found that the remaining conductive coating can be easily and effectively removed from used coated metallic electrodes without substantial damage to the metallic substrate by using the coated metallic electrodes as an anode, and by passing a current of about 1 to 100 A./dm.$^2$ of anode current density between the anode comprising the metallic substrate coated with one or more platinum group metals, iron group metals, or chemical compounds thereof, and steel cathodes in an electrolyte consisting of about 5 to 70 percent by weight of an aqueous solution of sulfuric acid, nitric acid, perchloric acid, salts thereof, chlorates or persulfates, or of a mixture solution thereof, at a temperature of about 0 to 50° C., for a period of time sufficient to effect removal of said coating, thereafter lightly rubbing the surface of thus treated electrode with a soft cloth and/or rinsing with water. Furthermore, in order to assure complete removal of the conductive coating and of the oxide on the surface of the metallic substrate, the resulting electrode substrates are dipped into an about 5 percent by weight aqueous hydrofluoric acid solution or an about 8 to 17 percent by weight aqueous hydrochloric acid solution for a few minutes, whereby the surface of the metallic substrate is made suitable for application of a new conductive coating.

BRIEF DESCRIPTION OF THE DRAWING

This invention is further described with reference to the accompanying drawing.

The FIGURE shows a graph of the relation between bath voltage and time for passing a current between a coated metallic electrode as an anode and steel cathodes.

DESCRIPTION OF THE PREFERRED EMBODIMENTS

Figure 1:
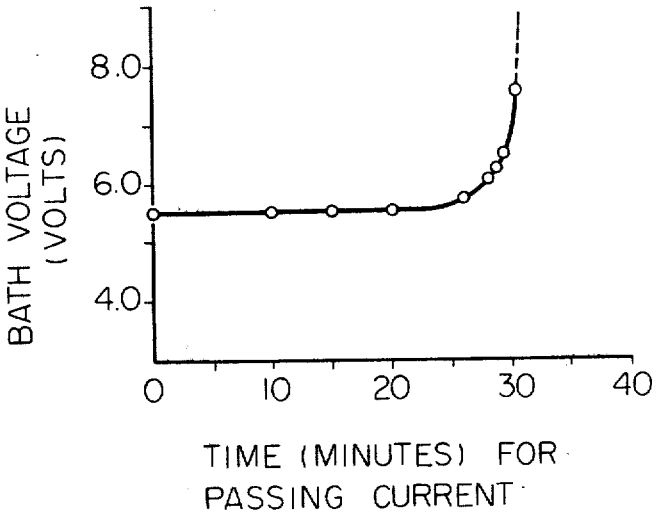

As used in the specification and claims attached hereto, the term "metallic electrodes coated with one or more platinum group metals, an iron group metal and a mixture thereof" includes an anode for electrolysis; said anode is composed of corrosion-resistant metals; such as titanium, zirconium, tantalum and niobium, coated with one or more platinum group metals, such as ruthenium, rhodium, iridium, platinum, and palladium, iron group metals, such as iron, cobalt and nickel; or oxides thereof. The term "sulfuric acid, nitric acid, perchloric acid, salts thereof, chlorates or persulfates" includes sulfuric acid; sulfates, such as sodium sulfate, potassium sulfate, lithium sulfate and ammonium sulfate; nitric acid; nitrates, such as sodium nitrate, potassium nitrate, lithium nitrate, ammonium nitrate; perchloric acid; perchlorates, such as sodium perchlorate, lithium perchlorate, ammonium perchlorate; chlorates, such as sodium chlorate, potassium chlorate, lithium chlorate; and persulfates, such as potassium persulfate and ammonium persulfate.

Aqueous solutions of the above acids and salts are used to attain the purpose of the invention, and said aqueous solutions may be employed effectively either separately or in combination. Furthermore, an amount of 0.1 to 3 percent by weight of hydrogen peroxide may be added to said aqueous solutions as an oxidation accelerator. The concentration of the aqueous solutions of said acids and salts may vary depending on the kinds of acids and salts, but may generally be in the range of about 5 to 70 percent by weight. If the concentration of said aqueous solutions is above 70 percent by weight crystals are apt to be deposited. On the other hand, if the concentration of the aqueous solutions is below 5 percent, the bath voltage and time required for passing a current are difficult to control and an increase in the bath voltage results in an increase in the electric power consumption.

The anode current density is within the range of about 1 to 100 A./dm.$^2$, and preferably, of about 3 to 60 A./dm.$^2$. When employing metallic electrodes coated with platinum group metals or oxides thereof as the anode, an anode current density in the range of about 10 to 60 A./dm.$^2$ is the most suitable for operation of this invention; when metallic electrodes coated with iron group metals or oxides thereof are used as the anode, and anode current density in the range of about 3 to 20 A./dm.$^2$ is most desirable in the process of the present invention.

The temperature of the aqueous solution of said acids and salts during the current passage may range from about 0° to 50° C., but can normally be room temperature. The period of time during which the current is passed varies depending on the temperature of the aqueous solution, the anode current density and the state of the coated metallic electrode; generally said period may fall in the range of about 20 minutes to 24 hours.

If the current density is high and the temperature of the aqueous solution is low, the current is passed for relatively a short period. Meanwhile, if a longer period of current passing is preferred, then lower anode current densities and somewhat higher temperature may be required. With the passing of the current, the bath voltage rises gradually until near the end of treating the coated metallic electrodes when it rises rapidly. During this period, the coating on the substrate metal is gradually broken and becomes brittle. If the bath voltage rises too rapidly, the electric current is disconnected, and the electrodes are removed from the electrolyte; the current should be disconnected before the breakdown voltage of the substrate metal(s) of the electrode(s) is reached. The final voltage at which current should be disconnected may vary depending on the type of coating on the conductive substrate, the type and the concentration of the aqueous solution(s), the anode current density, and the solution temperature, but usually the final voltage is set in the range of 6 to 15 volts, being chosen on the basis of practical experience.

By passing the current through the coated metallic electrode(s) used as anode(s) in an aqueous solution of the acid(s) or salt(s) specified above, the coating remaining on the substrate metal is made very brittle and it can then be stripped from the substrate metal with a minimum of damage to the substrate metal. Although the mechanism by which the nature of the coating is changed is not clear, it is considered that oxides present in the coating change to a higher oxidation state, whereby said oxides are less corrosion-resistant. It appears that conventional electrolytic treatments by which the oxidized surface of the substrate metal is electrolytically removed or polished away to prepare the surface of metal for coating are essentially different from the present invention in respect of action and mechanism. In electrolytic polishing, aqueous solutions of phosphates, caustic alkali or the like are employed as typical treating agents, but none of such treating agents is used in the process of the present invention.

The present invention is further illustrated by the following examples which are not intended to be limiting unless otherwise specified.

EXAMPLE 1

The coated metallic electrode comprising a titanium substrate having a ruthenium oxide coating thereon which was to be cleaned was used as an anode, and a current was passed between said anode and steel cathodes, in 50 percent by weight of an aqueous solution of sodium chlorate at 60 A./dm.$^2$ of anode current density, for 30 minutes. During this treatment, the bath temperature rose from 20° C. to 25° C. Bath voltage rose gradually from 5.5 volts, and after 25 minutes from the start of the treatment, began to rise rapidly and was 7.5 volts at the end of the treatment. (FIG. 1 is referred to.) The anode was removed from the bath, and rinsed with water and dried. The weight loss on the substrate while the current was passed was determined to be 0.1 percent. Thereafter, the thus treated metallic electrode was dipped into 5 percent by weight of an aqueous solution of hydrofluoric acid for 3 minutes to complete stripping of the coating. The weight loss of the substrate during this treatment was 1.6 percent. After the former treatment, the coating remaining on the surface of the substrate was completely stripped by dipping into the hydrofluoric acid solution and by rinsing with water, and the surface of titanium substrate was seen to be the same as that of an original substrate.

EXAMPLE 2

The coated metallic electrode comprising a titanium substrate having a platinum oxide coating thereon which was to be cleaned was used as an anode, and a current was passed between said anode and steel cathodes, in 5 percent by weight of an aqueous solution of potassium nitrate, at 10 A./dm.$^2$ of anode current density, for 12 hours. During this treatment, the bath temperature was 35 to 40° C. Bath voltage was constantly maintained at around 4.1 volts, but after about 11 hours from the start of the treatment, the bath voltage began to rise gradually and rose to 11.0 volts at the end of the treatment. After said treatment, the surface of the resulting metallic electrode was rubbed with a soft cloth and dipped into 5 percent by weight of an aqueous solution of hydrofluoric acid for 5 minutes to apply a new conductive coating. The weight loss on the substrate during these treatments was determind to be 2.0 percent. It was found that the newly coated metallic electrode had a uniform and intimately bonded coating comparable to an original electrode.

EXAMPLE 3

A coated metallic electrode comprising a tantalum substrate having a magnetite coating thereon which had been used as an anode for producing a chlorate by electrolysis for a long period of time, and which began to show signs of an increase in bath voltage of electrolysis, was used as an anode and a current was passed between said anode and steel cathodes in 62 percent by weight of an aqueous solution of sodium perchlorate, at 3 A./dm.$^2$ of anode current density, at 50° C. of a bath temperature, for 3 hours. The bath voltage at the end of this treatment was 8.2 volts. The weight los of the substrate metal after dipping the treated loss electrode into 17 percent by weight of an aqueous solution of hydrochloric acid for 2 minutes, was 0.8 percent by weight.

EXAMPLE 4

The coated metallic electrode which was to be cleaned was used as an anode. It was comprised of a titanium substrate having an iridium oxide coating thereon. A current was passed between said anode and steel cathodes, in a mixture solution of 15 percent by weight of an aqueous solution of sodium sulfate, 10 percent by weight of an aqueous solution of sulfuric acid and 2 percent by weight of an aqueous solution of hydrogen peroxide, at 25 A./dm.$^2$ of anode current density, at 20 to 30° C. of a bath temperature, for 2 hours. The weight loss of the substrate metal after dipping the treated metallic electrode into 5 percent by weight of an aqueous solution of hydrofluoric acid for 6 minutes was 2.6 percent by weight. A new iridium oxide coating was applied to the cleaned titanium substrate.

EXAMPLE 5

A recoated metallic electrode obtained by treatment according to Example 1 was employed as an anode for electrolysis of an aqueous solution of sodium chloride. The results obtained are given in Table 1. The recoated metallic electrode was similar to the originally coated metallic electrode in appearance and bath voltage characteristics. From these results, it was theoretically determined that a metallic electrode recoated after cleaning by the method according to the present invention would have a long life, while a metallic electrode recoated after cleaning by treatment only with an aqueous solution of hydrofluoric acid would have a short life.

TABLE I

| Electrode | Appearance of the surface of the coated metallic electrode | Average bath voltage* ($D_A$ =25 A./dm$^2$) |
|---|---|---|
| Original coated metallic electrode | Uniform | 2.85 |
| Metallic electrode recoated after only dipping used electrode in 5% wt. of an aqueous solution of hydrofluoric acid | Somewhat uneven | 2.97 |
| Metallic electrode recoated after treating a used electrode by the method according to Example I. | Uniform | 2.86 |

*Voltage value after one month from start on electrolysis.

As mentioned above, the coating which remained on the substrate metal could easily be removed from said substrate metal by simple electrochemical means according to the present invention.

If desired, the treatment according to the present invention may be automated. The weight loss of the substrate metal was as little as less than 3 percent during the cleaning treatments according to the present invention. The metallic electrode recoated after cleaning by the method according to the present invention was similar to an originally coated metallic electrode in appearance and bath voltage characteristics and also had a long life.

We claim:

1. A surface preparation process for recoating of a used coated metallic electrode coated with one or more platinum group [ metals ] *metal oxides* or iron group metal oxides, comprising using said electrode as an anode and passing a current at about 1 to 100 A./dm.$^2$ of anode current density between said anode and steel cathodes, in an electrolytic bath containing an aqueous solution containing about 5 to 70 percent by weight of a salt selected from the group consisting of a sulfate, a nitrate, a perchlorate, a chlorate, a persulfate and a mixture thereof, at a temperature of about 0 to 50° C., for a period of time sufficient to effect removal of coating remaining on said used electrode.

2. A surface preparation process according to claim 1, wherein a current is passed at about 3 to 60 A./dm.$^2$ of anode current density.

3. A surface preparation process according to claim 1, wherein a current is passed at about 10 to 60 A./dm.$^2$ of anode current density in case the metallic electrode used as an anode is coated with a platinum group metal oxide.

4. A surface preparation process according to claim 1, wherein a current is passed at about 3 to 20 A./dm.$^2$ of anode current density in case the metallic electrode used as an anode is coated with an iron group metal oxide.

5. A surface preparation process according to claim 1, wherein said bath also contains about 0.1 to 3 percent by weight of hydrogen peroxide as an oxidation accelerator.

6. A surface preparation process for recoating of a used coated metallic electrode coated with one or more platinum group [ metals ] *metal oxides* or iron group metal oxides, comprising using said electrode as an anode and passing a current at about 1 to 100 A./dm.$^2$ of anode current density between said anode and steel cathodes, in an electrolytic bath containing an aqueous solution containing about 5 to 70 percent by weight of a salt selected from the group consisting of a sulfate, a nitrate, a perchlorate, a chlorate, a persulfate and a mixture thereof, at a temperature of about 0 to 50° C., for a period of time sufficient to effect removal of any remaining coating, thereafter lightly rubbing the surface of the thus treated electrode with a soft cloth and/or rinsing with water, and dipping the resulting electrode substrate into an about 5 percent by weight aqueous hydrofluoric acid solution or an about 8 to 17 percent by weight aqueous hydrochloric acid solution for a few minutes.

7. A surface preparation process for recoating of a used coated metallic electrode coated with one or more platinum group [ metals ] *metal oxides*, comprising using said electrode as an anode and passing a current at about 10 to 60 A./dm.$^2$ of anode current density between said anode and steel cathodes, in an electrolytic bath containing an aqueous solution containing about 5 to 70 percent by weight of a salt selected from the group consisting of a sulfate, a nitrate, a perchlorate, a chlorate, a persulfate and a mixture thereof, at a temperature of about 0 to 50° C., for a period of time sufficient to effect removal of any remaining coating, thereafter lightly rubbing the surface of a treated electrode with a soft cloth and/or rinsing with water, and dipping the resulting electrode substrate into about 5 percent by weight of an aqueous solution of hydrofluoric acid for a few minutes.

8. The process of claim 1, wherein said salt is sodium, potassium, lithium or ammonium sulfate.

9. The process of claim 1, wherein said salt is sodium, potassium, lithium, or ammonium nitrate.

10. The process of claim 1, wherein said salt is sodium, lithium or ammonium perchlorate.

11. The process of claim 1, wherein said salt is sodium, potassium or lithium chlorate.

12. The process of claim 1, wherein said salt is potassium or ammonium persulfate.

* * * * *

UNITED STATES PATENT AND TRADEMARK OFFICE

CERTIFICATE OF CORRECTION

PATENT NO. : Re 28,849

DATED : June 8, 1976

INVENTOR(S) : REIICHI ITAI et al

It is certified that error appears in the above-identified patent and that said Letters Patent are hereby corrected as shown below:

Claim 3, last line, after "metal", rewrite "oxide" as

--- *oxide* ---.

Signed and Sealed this

Twenty-eighth Day of December 1976

[SEAL]

*Attest:*

RUTH C. MASON
*Attesting Officer*

C. MARSHALL DANN
*Commissioner of Patents and Trademarks*